United States Patent [19]

DeMonsy et al.

[11] 4,061,872
[45] Dec. 6, 1977

[54] CABLE SPLICE KIT

[75] Inventors: Richard L. DeMonsy, Encino; Norman K. Hankins, Northridge, both of Calif.

[73] Assignee: Hexcel Corporation, Dublin, Calif.

[21] Appl. No.: 644,407

[22] Filed: Dec. 29, 1975

Related U.S. Application Data

[63] Continuation of Ser. No. 412,388, Nov. 2, 1973, abandoned.

[51] Int. Cl.² .................................. H02G 15/18
[52] U.S. Cl. ..................... 174/138 F; 174/76; 174/93; 249/141; 251/345; 285/294
[58] Field of Search .............. 174/23 R, 76, 77 R, 174/91, 92, 93, 138 F; 138/92; 220/253; 249/141; 285/121, 294, 297; 403/6; 222/142.9, 461, 486, 548, 555, 560; 251/345; 243/34

[56] References Cited

U.S. PATENT DOCUMENTS

| | | | |
|---|---|---|---|
| 1,032,178 | 7/1912 | Bartlett | 243/34 |
| 1,034,909 | 8/1912 | Graybill | 138/92 X |
| 2,908,744 | 10/1959 | Bollmeier | 174/76 |
| 2,967,795 | 1/1961 | Bollmeier et al. | 174/76 X |
| 3,242,255 | 3/1966 | Falkenstein et al. | 174/76 X |
| 3,518,358 | 6/1970 | Brown | 174/93 X |
| 3,771,112 | 11/1973 | Thompson et al. | 174/93 UX |
| 3,827,704 | 8/1974 | Gillemot et al. | 174/93 X |

FOREIGN PATENT DOCUMENTS 177,138 11/1961 Sweden ........................ 174/93

OTHER PUBLICATIONS

Advertisement entitled "Tap Cap Closures", *Transmission and Distribution*, Feb. 1972, p. 144.

*Primary Examiner*—Laramie E. Askin
*Attorney, Agent, or Firm*—Townsend and Townsend

[57] ABSTRACT

An enclosure for encapsulating and sealing a splice between two or more underground cables is disclosed. A tubular chamber is provided to receive the splice, and the chamber has a radial access hole for pouring plastic compound into the chamber. The cables to be spliced pass through caps which enclose the ends of the chamber. A rotatable sleeve fits over the center of the chamber. The sleeve has an aperture corresponding to the access hole in the tubular chamber, and an outwardly projecting funnel extending from the aperture. The aperture in the sleeve can be aligned with the access hole and liquid plastic compound poured through the funnel into the tubular chamber to surround the splice. When the chamber has been filled with plastic compound, the sleeve can simply be rotated with respect to the chamber and locked to disalign the aperture and the access hole and thereby seal the chamber.

4 Claims, 8 Drawing Figures

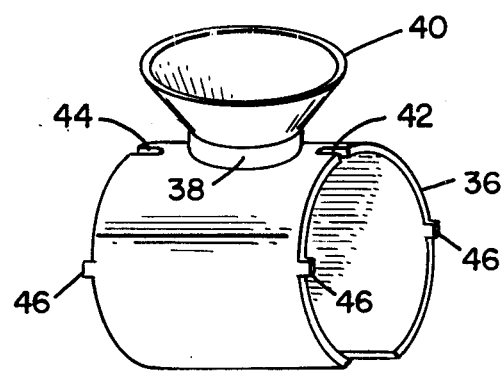
FIG_1
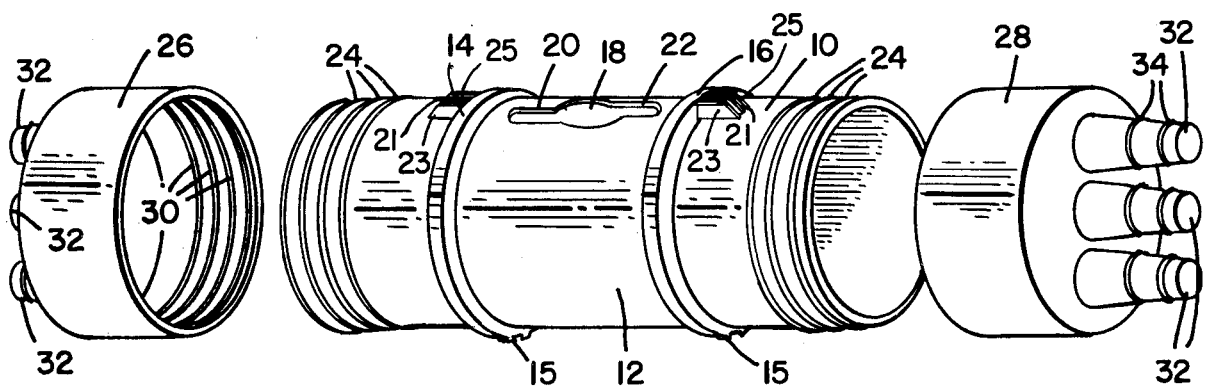
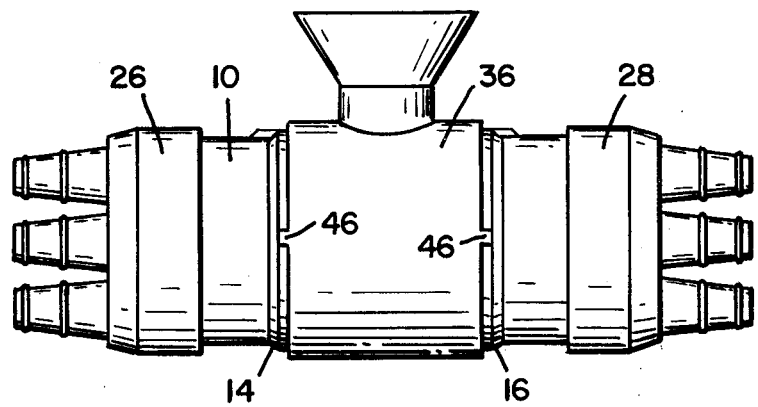
FIG_2
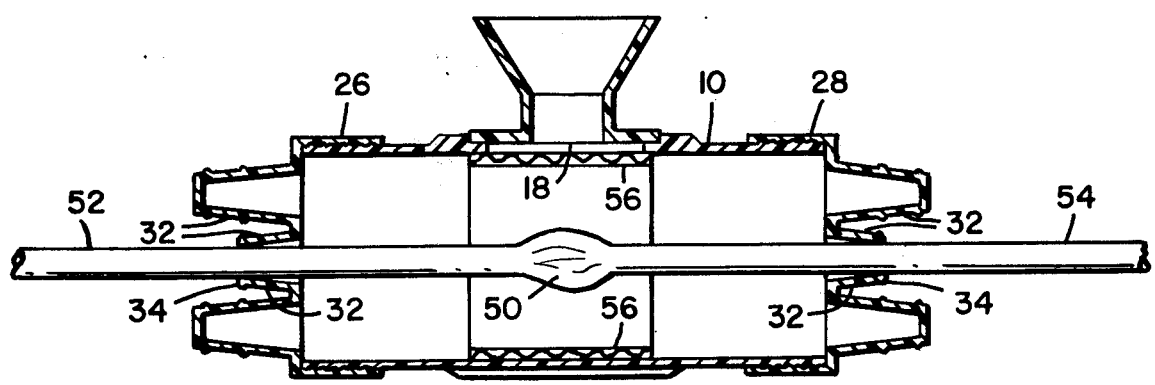
FIG_3

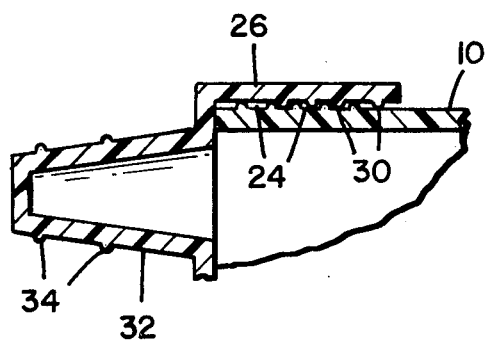
FIG_4
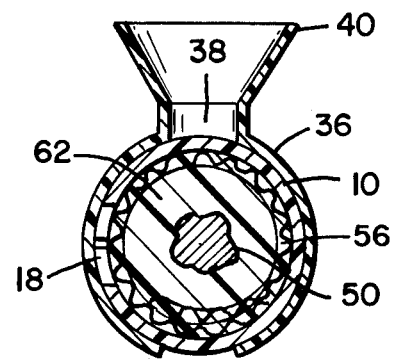
FIG_7
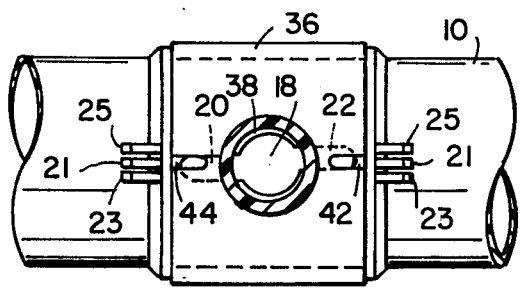
FIG_5
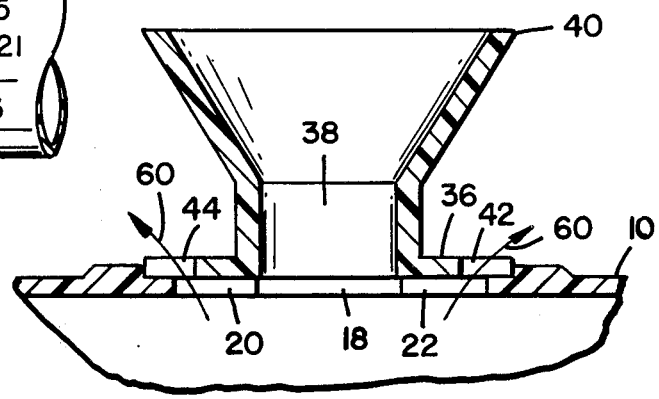
FIG_6
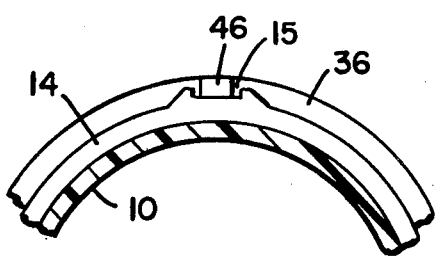
FIG_9
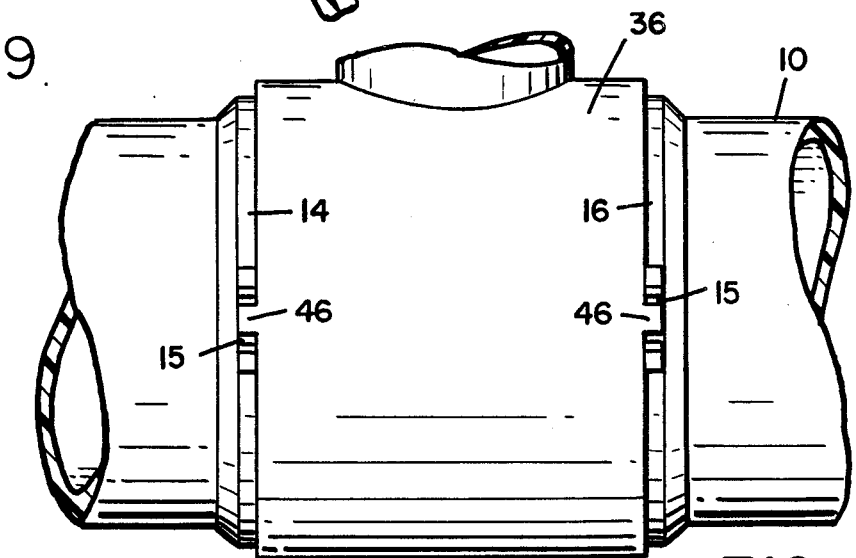
FIG_8

CABLE SPLICE KIT

This application is a continuation of application Ser. No. 412,388 filed Nov. 2, 1973, now abandoned.

BACKGROUND OF THE INVENTION

I. Field of the Invention

This invention is related to cable splice enclosures, and in particular to an enclosure for encapsulating and sealing a splice between two or more underground cables.

II. Background of the Invention

When splices are made between underground cables, or other cables exposed to the elements, it becomes necessary to encapsulate and seal the splice so that the ends of the spliced cables are not exposed. It has become customary to encapsulate the splice with a plastic enclosure, then fill the enclosure with a plastic compound to fully insulate the splice. The splice is thus electrically insulated, strengthened, and protected from the eroding effect of the elements.

A wide variety of enclosures have been designed to fit around the splice and receive the plastic compound, and these enclosures are acceptable in that the splice is insulated. However, the capsules currently available are often quite difficult for the ordinary telephone lineman to use, and usually require an inordinate amount of time and effort to perform a single splice. Since the splice enclosures are difficult to form, they are often formed incorrectly and do not properly insulate the splice.

The most common problem with available cable splice enclosures is that the enclosure cannot be immediately sealed after it has been filled with a liquid plastic compound. Rather, the lineman must wait for the plastic compound to set before placing the splice underground. Often, as exhibited by U.S. Pat. No. 2,862,042, the enclosure must be held upright while the plastic compound sets otherwise the compound will run out of the enclosure. These difficulties basically require that the lineman wait for the plastic compound in one splice to at least partially set before burying the encapsulated splice underground.

While a wide variety of enclosures have been developed to avoid deficiencies of earlier devices, these devices introduce new features which still render them difficult to use. For example, the apparatus disclosed in U.S. Pat. No. 2,862,042 provides only a single means at each end for the entrance of a cable, thus making Y splices wherein two cables exit at the same end of the enclosure quite difficult. Splice enclosures such as that illustrated in U.S. Pat. No. 3,138,657 require a special container for injecting the plastic compound into the enclosure. Most prior art devices disclose no method for spacing the splice away from the walls of the enclosure, which is necessary to insure that the plastic compound completely insulates the splice. Due to difficulties such as these, prior art devices do not provide the lineman with a convenient means for sealing underground cable splices.

SUMMARY OF THE INVENTION

The present invention discloses an enclosed chamber adapted to receive a splice therein. The chamber has a cylindrical central section having a radial access hole for the pouring of plastic compound into the chamber. Means are provided for providing apertures for passage of cables to the interior of the chamber. A sleeve fits over the central section of the chamber, and is rotatable with respect to the chamber. The sleeve has an aperture corresponding to the access hole in the central section of the chamber. The aperture in the sleeve can be aligned with the access hole for pouring plastic compound into the interior of the chamber. When the chamber has been filled with plastic compound, the sleeve can be rotated with respect to the chamber and locked to disalign the apertures and seal the chamber.

Rotating and locking the sleeve seals the chamber so that it can be immediately dropped into the ground, even though the plastic compound has not yet set. This avoids necessity for the lineman propping up the capsule in a vertical position so that the plastic compound does not run out, and then waiting for the plastic compound to set before burying the splice. Corresponding beads and notches are provided on the sleeve and chamber to lock the sleeve in the sealing position so that the apertures will not accidentally realign. Multiple beads or notches can be provided so that the sleeve is locked when rotated in either direction, further simplifying the lineman's task.

The present invention provides small secondary apertures in the chamber and the sleeve which partially overlap to provide an escape vent for the air in the chamber as the chamber is being filled. This allows the plastic compound to rapidly pour into the chamber and completely occupy the entire interior volume of the chamber without leaving air pockets. In prior devices with which we are familiar the lineman has to rock the enclosure from side to side to displace captive air and completely fill the chamber. Since the apertures providing the air escape result from overlapping of the secondary apertures in the chamber and the sleeve, when the sleeve is rotated to disalign the access hole and primary aperture, the air escape is sealed along with the primary openings, completely sealing the chamber.

The present invention also provides a spacer which prevents contact of the splice with the side walls of the chamber. The spacer comprises a strip of spacing material which is flexible, highly porous sponge-like material. The plastic compound easily permeates the porous spacing material so that the splice is completely enclosed by the plastic compound. The spacer can be provided with a gap corresponding to the aperture in the central section of the chamber to allow free flow of plastic compound into the chamber.

The preferred embodiment of the present invention provides end caps which simply snap onto the chamber to enclose the chamber. These caps are provided with a plurality of annular ridges which engage complementary annular grooves on the ends of the chamber. The cap is highly resilient so that it can be simply pushed over the end of the chamber, and the ridges will engage the grooves to enclose the end of the chamber. When the cap is to be removed, it may simply be pushed off the end of the chamber, but the cap has sufficient purchase on the chamber so that it will not accidentally become disengaged. Prior art devices usually require that the end cap be screwed onto the chamber, which is needlessly difficult and expensive since the cap is generally only placed on the end of the chamber once, then sealed by the plastic compound.

The end caps are provided with a multiplicity of tapered protrusions which extend upwardly from the cap. The protrusions are closed prior to use. A separate protrusion is then cut to provide an orifice for each cable to be spliced. The tapered protrusions are cut at the desired station to provide an orifice having a diameter substantially equal to the cable which results in a snug, liquid tight fit between the cable and the end cap.

With the present invention, different types of splices between two or more cables can be rapidly sealed and insulated. However, the seal is complete, since the plastic fills the entire chamber and is not allowed to run out of the chamber, and the splice itself is spaced from the walls of the chamber. The sealing of the splice can be easily and rapidly performed by an ordinary lineman without special tools, and presents a relatively foolproof means of insulating cable splices.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is an exploded perspective view of the enclosure of the present invention;

FIG. 2 is an elevational view of the enclosure illustrated in FIG. 1 in the assembled configuration;

FIG. 3 is a cross-sectional elevational view of the enclosure of FIGS. 1 and 2 illustrating a splice encapsulated in the enclosure;

FIG. 4 is a fragmentary view illustrating the attachment of the end caps to the tubular chamber;

FIG. 5 is a fragmentary top view illustrating the aperture in the sleeve and the access hole in the tubular chamber aligned to allow for pouring of plastic compound into the chamber;

FIG. 6 is a fragmentary side view illustrating the aperture in the sleeve and the access hole in the tubular chamber aligned to allow for pouring of plastic compound into the chamber;

FIG. 7 is a side cross-sectional elevational view of the aperture in the sleeve and the access hole in the tubular chamber disaligned to seal the chamber;

FIG. 8 is a fragmentary view illustrating the sleeve locked in the disaligned position;

FIG. 9 is a fragmentary elevational view of the sleeve locking mechanism.

DESCRIPTION OF THE PREFERRED EMBODIMENT

The elements of the preferred embodiment are illustrated by way of reference to FIG. 1. In this embodiment, a tubular chamber 10 is provided which is open at either end. Chamber 10 has a cylindrical center portion 12 bounded by circumferential shoulders 14 and 16 having notches 15 on the underside thereof. A radial access hole 18 is provided in center section 12 of chamber 10. Access hole 18 is generally circular, but has two oppositely directed longitudinal extensions 20 and 22. Extensions 20 and 22 are partially axially offset from each other and from the center of access hole 18. Corresponding sets of guides 21, 23, 25 are provided on the outer edges of shoulders 14 and 16 respectively. Each set includes a central guide 21 aligned with the center of access hole 18, and two outer guides 23, 25 aligned with longitudinal extensions 20, 22 respectively. The ends of tubular chamber 10 are provided with a plurality of circumferential grooves 24.

End caps 26 and 28 are adapted to fit over the ends of the tubular chamber 10 to enclose the ends of the chamber. A plurality of circumferential ridges 30 are provided on the interior surfaces of caps 26 and 28. Ridges 30 are adapted to fit into grooves 24 when the caps 26 and 28 are placed over the ends of chamber 10 to firmly fasten the caps to the chamber. Caps 26, 28 are highly resilient so as to easily slip over the ends of chamber 10 but still achieve a tight seal.

In the embodiment of the present invention illustrated in FIG. 1, end caps 26 and 28 are provided with three outwardly projecting tapered protrusions 32 on each cap. Protrusions 32 are normally sealed, but are adapted to be cut to provide an aperture for passage of the cable to be spliced into the tubular chamber 10. Ridges 34 are provided on protrusions 32 to indicate the proper depth of cut for different types of cables. Since the protrusions are tapered, cables of varying diameters can be accommodated. Several protrusions 32 are provided on each cap 26, 28, but only those protrusions actually used to pass cables need be cut for any particular splice.

Referring still to FIG. 1, a sleeve 36 is adapted to fit over center portion 12 of tubular chamber 10. Sleeve 36 has a split lower portion so that the sleeve can be fitted over tubular chamber 10. Sleeve 36 has an aperture 38 and a funnel 40 projecting outwardly from the aperture. A pair of oppositely directed longitudinal slots 42 and 44 are located on either side of sleeve 36 adjacent aperture 38. Beads 46 project from both sides of sleeve 36. Each side of sleeve 36 has two beads 46, each bead located 90° from aperture 38 on opposite sides of that aperture.

The enclosure illustrated in the exploded view of FIG. 1 is shown in the assembled configuration in FIG. 2. End caps 26 and 28 are fitted over the ends of tubular chamber 10. Sleeve 36 is fitted over the center portion of tubular chamber 10 between the raised circumferential shoulders 14 and 16. Beads 46 ride over shoulders 14 and 16.

The manner in which a splice 50 is encapsulated in tubular chamber 10 is illustrated by way of reference to FIG. 3. Splice 50 comprises a linear splice between two cables, but any type of splice using up to three cables from each of two directions can be accommodated by tubular chamber 10. One of the protrusions on both end cap 26 and end cap 28 is cut along the ridge 34 corresponding to the particular cable involved. The protrusions 32 on end caps 26 and 28 are cut prior to formation of splice 50. End cap 26 is then slipped over cable 52 and end cap 28 over cable 54 with the tapered protrusions forming a frictional seal with the cables, and a tubular chamber 10 is slipped over one of the set of cables. The splice 50 is then formed in the customary manner. Splice 50 is then wrapped in spacing material 56, comprising highly porous flexible sponge-like material. Splice 50 with spacing material 56 is then placed inside tubular chamber 10 and centered. Spacing material 56 preferably has a small gap which is aligned with access hole 18. End caps 26 and 28 are then pressed over the ends of tubular chamber 10 to seal the chamber. As illustrated in FIG. 4, ridges 30 slip between grooves 24 on the end of tubular chamber 10 to firmly fasten end cap 26 (or 28) to the tubular chamber.

After the splice 50 has been encapsulated in tubular chamber 10, the splice is ready to be sealed with plastic compound. In order that the plastic compound can be poured into chamber 10, longitudinal slots 42, 44 on sleeve 36 are aligned with center guides 21 as illustrated in FIG. 5. In this configuration, aperture 38 in sleeve 36 is exactly aligned with access hole 18 in chamber 10. The plastic compound can thus be readily poured through funnel 40 into chamber 10 as illustrated by way of reference to FIG. 6. An escape for air from chamber 10 as the plastic compound is being poured thereinto is provided by the overlapping of extensions 20, 22 of access hole 18 with slots 44, 42 in sleeve 36.

When slots 44, 42 are aligned with guides 21, a pair of escape holes are provided, and air escapes from the chamber as illustrated by arrows 60 in FIG. 6. However, as the chamber becomes nearly filled with plastic compound, the compound will begin to run out or the other of the air escape holes. It is unlikely that the chamber can be held perfectly horizontal by the user, and one of the sides will fill with plastic compound before the entire chamber is filled. In this situation, the user can prevent the compound from flowing out the lower of the two air holes by aligning slots 42, 44 with the appropriate outer guide vane 23 or 25. In this manner, the lower escape hole is sealed but the upper escape hole will remain open since extension 20, 22 of the access hole 18 are partially disaligned. The chamber 10 can then be completely filled with plastic compound and the chamber is ready to be sealed.

The sealed configuration of chamber 10 is illustrated in the side cross-sectional elevational view of FIG. 7. Sleeve 36 has been rotated 90° to disalign aperture 38 in the sleeve and access hole 18 in the chamber, thus sealing the tubular chamber 10. Since the air escape hole was provided by overlapping apertures in the sleeve and the tubular chamber, the escape holes are also sealed by rotating sleeve 36. In this configuration, splice 50, spaced from the walls of tubular chamber 10 by spacing material 56, is completely enclosed by plastic compound 62.

When sleeve 36 is rotated 90° in either direction to seal tubular chamber 10, two of the bosses 46 engage notches 15 on shoulders 14 and 16 as illustrated in FIG. 8. The engagement of beads 46 with notches 15 to lock sleeve 36 in the sealing position is further illustrated in the fragmentary view of FIG. 9. This locking prevents sleeve 36 from rotating with respect to tubular chamber 10 and accidentally realigning aperture 38 with access hole 18 and allowing the plastic compound to flow out of tubular chamber 10.

In operation, the enclosure of the present invention is used as follows. A lineman is provided with a plurality of tubular chambers 10 having sleeves 36 attached, and also a plurality of end caps 26 (or 28). When a splice is to be encapsulated and sealed, the lineman first determines the type of splice required, and the number of cables will which emanate from the splice in each of the two directions. The lineman then cuts the appropriate number of tapered protrusions 32 at the ring 34 corresponding to that particular type of cable on each of two end caps. The end caps are then slipped over the cables, and a tubular chamber 10 having sleeve 36 attached is slipped over one of the sets of cables. The splice is then formed in the customary manner.

After the splice is formed, spacing material 56 is wrapped around the splice, preferably leaving a small gap in the spacing material at the top of the splice. Tubular chamber 10 is then positioned over the splice with the splice centered in the tubular chamber. The gap provided in the spacing material is aligned with access hole 18 in chamber 10, and the chamber is then positioned so that access hole 18 is on top. The end caps 26 and 28 are then pressed over the ends of tubular chamber 10. Since tapered protrusions 32 were cut to the size of the cables, the interface between the cables and the chamber is sealed by frictional contact of the tapered protrusions 32 with the cables.

Sleeve 36 is next rotated to line up slots 42, 44 with guides 21 so that aperture 38 is aligned with radial access hole 18. In this position, extensions 20 and 22 of aperture 18 are aligned with slots 42 and 44 in the sleeve. Plastic compound is then poured into the funnel portion of sleeve 36 and into chamber 10. No special container is needed for the plastic compound. The plastic compound will flow easily into chamber 10 since escapes for air are provided by the overlapping apertures. One or the other of the escapes for air can be sealed so that the plastic compound completely fills the entire chamber. Escape of plastic compound through the remaining overlapping aperture signals the lineman that the chamber 10 is completely filled with plastic compound. The lineman then rotates sleeve 36 with respect to chamber 10 to seal the chamber.

When sleeve 36 is rotated by the lineman in either direction, two of the beads 46 will engage notches 15 on the underside of shoulders 14 and 16. This locks sleeve 36 in a position with aperture 38 disaligned with aperture 18, thus sealing the chamber. With the chamber thus locked in the sealed position, the lineman can simply drop the enclosed splice in the ground without waiting for the plastic compound to harden and continue with his work.

The preferred embodiment of the present invention has been disclosed above. It is obvious that modifications and adaptations of that embodiment will occur to those skilled in the art. In particular, it is apparent that only the central portion of the chamber need be tubular, and the ends may be a different shape. However, it is to be expressly understood that such modifications and adaptations are within the scope of the present invention, as set forth in the following claims.

What is claimed is:

1. An enclosure kit for encapsulating and sealing a splice between two cables comprising:
   an enclosed chamber adapted to receive the splice therein, said chamber having a cylindrical center section having an access hole for the pouring of plastic compound into said chamber, said access hole having oppositely directed longitudinal extensions partially axially offset and extending outwardly from a central portion of said access hole, said chamber further having means for providing apertures for passage of cables to the interior of said chamber; and
   a sleeve adapted to be placed over the cylindrical section of the chamber and to be rotatable with respect thereto, said sleeve having an aperture corresponding to the central portion of the access hole and the cylindrical section of the chamber and a funnel portion extending outwardly from the aperture, and a pair of slots located on the opposite sides of the aperture with said slots overlapping each said extension when said aperture is aligned with the central portion of the access hole to thereby provide a pair of air escape holes, one or the other of said slots adapted to overlap one or the other of the extensions when said aperture is partially disaligned with the center portion of said access hole to provide a single air escape hole on one or the other side of the aperture to allow complete filling of said chamber with plastic compound.

2. An enclosure kit as recited in claim 1 and additionally comprising guide means on the exterior of the enclosed chamber positioned to lie adjacent the sleeve when the sleeve is on the chamber, said guide means adapted to alternatively indicate exact alignment of said aperture with said access hole or partial disalignment of said aperture with said access hole for alternatively providing a pair of air escape holes or a single air escape hole on one or the other side of the aperture.

3. An enclosure kit for encapsulating and sealing a splice between two or more cables with plastic compound, said enclosure comprising:
   a tubular chamber adapted to receive the splice therein, said chamber having an access hole in the side thereof including a generally circular portion and at least one narrow longitudinal portion extending from the circular portion;
   a pair of caps adapted to be connected to the ends of the tubular chamber to close said ends, each said cap including means for providing at least one aperture for passage of a cable therethrough; and
   a sleeve adapted to be disposed on the tubular chamber and to be rotatable with respect thereto, said sleeve having an aperture corresponding to the access hole in the tubular chamber and an outwardly projecting funnel extending from the aperture, said aperture in the sleeve being rotatably alignable with the access hole so that plastic compound can be poured through the funnel and into the tubular chamber and the sleeve being rotatable with respect to the chamber to disalign the aperture and the access hole to seal said chamber after the chamber has been filled with a plastic compound, said sleeve having a slot adapted to partially overlap the longitudinal portion of the aperture in the tubular chamber when the aperture in the sleeve is aligned with the access hole in the tubular chamber to provide an opening for the escape of air from the tubular chamber as said tubular chamber is filled with plastic compound.

4. An enclosure kit for encapsulating and sealing a splice between two cables comprising:
   a closable chamber adapted to receive the splice therein, said chamber having a cylindrical central section having an access hole for the pouring of plastic compound into said chamber, said access hole having oppositely directed longitudinal extensions, said extensions being partially axially offset, said chamber further having means for closing the chamber after passage of cables to the interior of said chamber; and
   a sleeve adapted to be placed over the cylindrical section of the chamber and to be rotatable with respect thereto, said sleeve having an aperture corresponding to the access hole in the cylindrical section of the chamber and a funnel portion extending outwardly from the aperture to facilitate pouring of plastic compound through said aperture, said aperture in the sleeve being rotatably alignable with the access hole for permitting plastic compound to be poured into the interior of said chamber through the funnel, and the sleeve being rotatable with respect to the chamber to disalign the aperture in the sleeve and the access hole to seal the chamber, said sleeve having a pair of slots formed therein, said slots located on opposite sides of the aperture in said sleeve and aligned with the center of said aperture so that said slots can overlap each said extension when said aperture is aligned with said access hole to provide a pair of air escape holes, one or the other of said slots being adapted to overlap one or the other of the extensions when said aperture is partially disaligned with said access hole to provide a single air escape hole on one or the other side of said aperture to allow complete filling of said chamber with plastic compound.

* * * * *